(12) United States Patent
Dedene et al.

(10) Patent No.: US 7,443,466 B2
(45) Date of Patent: Oct. 28, 2008

(54) DISPLAY ELEMENT ARRAY WITH OPTIMIZED PIXEL AND SUB-PIXEL LAYOUT FOR USE IN REFLECTIVE DISPLAYS

(75) Inventors: Nele Dedene, Houthalen-Helchteren (BE); Robbie Thielemans, Nazareth (BE); Herbert Van Hille, Cambridge, MA (US)

(73) Assignee: Barco N.V., Kortrijk (BE)

( * ) Notice: Subject to any disclaimer, the term of this patent is extended or adjusted under 35 U.S.C. 154(b) by 521 days.

(21) Appl. No.: 11/060,281

(22) Filed: Feb. 18, 2005

(65) Prior Publication Data

US 2005/0185003 A1 Aug. 25, 2005

Related U.S. Application Data

(60) Provisional application No. 60/547,393, filed on Feb. 24, 2004.

(51) Int. Cl.
*G02F 1/1335* (2006.01)
(52) U.S. Cl. ..................................... 349/106
(58) Field of Classification Search ................ 349/106, 349/108; 345/87
See application file for complete search history.

(56) References Cited

U.S. PATENT DOCUMENTS

| 4,800,375 A * | 1/1989 | Silverstein et al. .......... 345/694 |
| 5,815,133 A | 9/1998 | Tsuboyama et al. |
| 2002/0015110 A1 | 2/2002 | Brown |

FOREIGN PATENT DOCUMENTS

| EP | 0 810 578 A | 12/1997 |
| WO | 00/45368 A | 8/2000 |
| WO | 03/060870 A | 7/2003 |

OTHER PUBLICATIONS

McDonnell, D.G., et al.: "An Ultra-High-Resolution Ferroelectric Liquid-Crystal Video Display", Sid International Symposium—Digest of Technical Papers. Seattle, May 16-21, 1993, Playa Del Rey. Sid, US, vol. 1, Part 1, vol. 24, May 16, 1993, pp. 654-657.

* cited by examiner

*Primary Examiner*—James A Dudek
(74) *Attorney, Agent, or Firm*—Bacon & Thomas, PLLC

(57) ABSTRACT

A pixel structure is provided comprising a plurality of sub-pixels, each sub-pixel comprising at least two sub-sub-pixels, each sub-sub-pixel being for the emission of light of one of at least two colors, the sub-sub-pixels being uniformly arranged within the sub-pixel, each sub-pixel of one pixel comprising the same arrangement of sub-sub-pixels. Furthermore, a reflective display comprising pixels with the pixel structure of the invention is provided, having an high image quality.

14 Claims, 3 Drawing Sheets

(a)  (b)

(a)  (b)

DISPLAY ELEMENT ARRAY WITH OPTIMIZED PIXEL AND SUB-PIXEL LAYOUT FOR USE IN REFLECTIVE DISPLAYS

TECHNICAL FIELD OF THE INVENTION

The present invention relates to reflective displays and methods of operating the same as well as computer programs and software for providing drivers for such reflective displays. More particularly, the invention relates to a reflective display comprising pixels having an optimized pixel and sub-pixel layout, which makes it possible to enhance image quality.

BACKGROUND OF THE INVENTION

Reflective displays can be based on different display technologies (e.g. electrophoretic, electrochromic, cholesteric, gyroelectric, interferometric modulation, . . . ). Each display technology is based on reflective materials, molecules or structures that can be combined into the picture elements or pixels that comprise a display.

Reflective displays rely on ambient light for information display and hence are ideal devices for, for example, portable electronic equipment as they do not require the power hungry backlight illuminator. However reflective displays suffer from inherent difficulties in producing high contrast and high colour images with adequate resolution. Some of the newer reflective technologies however have made substantial headway into overcoming these problems, especially the full color issue.

FIG. 1 illustrates a conventional stripe-type pixel structure, comprising three primary colors, i.e. red (R), green (G) and blue (B), as it is most often used in reflective displays.

SUMMARY OF THE INVENTION

It is an object of the present invention to provide a pixel structure for a reflective display with enhanced image quality.

The above objective is accomplished by a pixel structure and a display device according to the present invention.

The present invention provides a pixel structure comprising a plurality of sub-pixels, each sub-pixel comprising at least two sub-sub-pixels being for the emission of light of one of at least two colours, the sub-sub-pixel being uniformly arranged within said sub-pixel. Preferably, each sub-pixel of one pixel comprises the same arrangement of sub-sub-pixels. Each of the at least two colors may, for example, be any of the primary colours blue, red and green. The pixel pitch may preferably be between 5 nm and 50 nm.

An advantage of the invention is that minimum viewing distance at which the individual pixels can not be distinguished will become smaller compared to a display with the same resolution but using the standard pixel structure. Hence, optimal viewing distance of a display, comprising the pixels according to the invention, will be reduced.

In another aspect of the invention, a reflective display is provided. The reflective display comprises:

a plurality of picture elements;
an addressing arrangement for addressing each picture element selectively and independently with one image datum; and
each picture element comprising a plurality of sub-pixels, each sub-pixel comprising at least two sub-sub-pixels, each sub-pixel being for the emission of light of one of at least two colours, the sub-sub-pixels being uniformly arranged within said sub-pixel. Preferably, each sub-pixel comprises the same arrangement of sub-sub-pixels.

The reflective display may, for example, be a tiled display.

The addressing arrangement may be such as to select different picture elements or pixels, sub-pixels and/or sub-sub-pixels separately or at the same time.

The reflective display may furthermore comprise a means for driving the plurality of picture elements. The means for driving the plurality of picture elements may be arranged such as to select different picture elements, sub-pixels and/or sub-sub-pixels separately or at the same time. The means for driving the plurality of picture elements may be arranged such as to selectively apply a particular resolution and/or bit depth. Said particular resolution and/or bit depth may be selectively applied within an area of the display, within an area of a pixel or within an area of a sub-pixel. In that way, it becomes possible to make a choice between a higher resolution and a smaller number of gray scales on the one hand or a smaller resolution and a larger number of gray scales on the other hand. This allows using the same display hardware in order to realize different display resolutions. Furthermore, the means for driving the plurality of picture elements may be arranged such as to perform intelligent internal bitmapping. Intelligent internal bitmapping allows to increase the effective display resolution without loosing bit depth.

Further the present invention includes software for providing the means for driving pixels as described above. This software may be provided stored on a data carrier such as a CD-ROM, e.g. in machine readable and executable form.

In the reflective display according to the invention, the addressing arrangement and the picture elements may be arranged for display of an arbitrary image, furthermore comprise an area between the plurality of picture elements and may furthermore comprise means for varying the luminance of the area. The luminance of the area between the picture elements or pixels may be varied in order to optimise the image quality of the display.

In another aspect of the invention, a display is provided, comprising a plurality of pixels and an addressing arrangement for addressing each pixel independently and selectively to display an arbitrary image, further comprising an area between neighbouring pixels and means for varying the luminance of the area.

Other features and advantages of the present invention will become apparent from the following detailed description, taken in conjunction with the accompanying drawings, which illustrate, by way of example, the principles of the invention.

These and other objects and features of the present invention will become better understood through a consideration of the following description taken in conjunction with the drawings.

DESCRIPTION OF THE PREFERRED EMBODIMENTS

Figure 1:
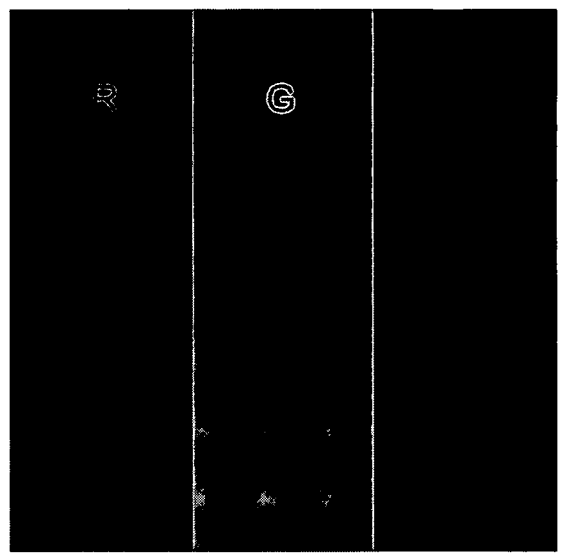
FIG. 1 shows a conventional stripe-type pixel structure comprising three primary colours, i.e. red (R), green (G) and blue (B).

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

The present invention provides a pixel structure for use in, for example, a passive content full color or monochrome reflective display. The present invention can be used with both active and passive displays. The present invention is implementable on pixelated displays, which are sometimes also called fixed format displays, e.g. LCD, OLED, EL, Plasma displays. The present invention can be applied to any reflective or transmissive or emissive displays. The pixel structure comprises sub-pixels which each comprise for example three primary colours such as e.g. red, green and blue. It is however possible to use other primary colours or it is also possible to use more or less than 3 primary colours.

Figure 2A:
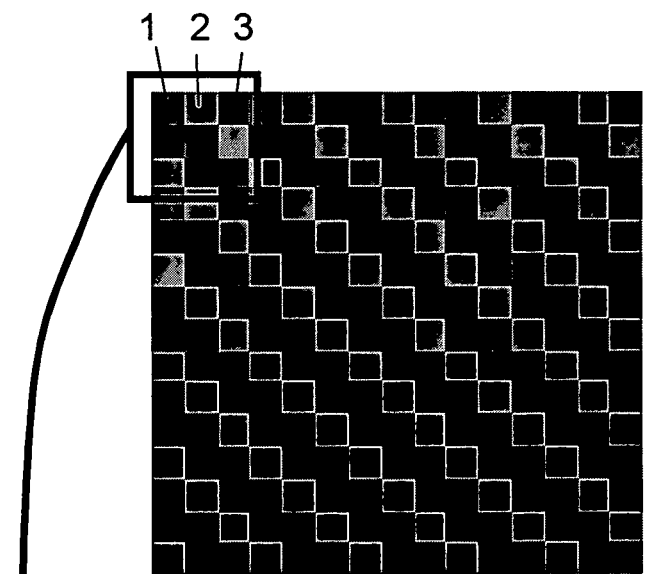
FIG. 2A illustrates a staggered RGB pixel according to an embodiment of the present invention.

An example of a pixel structure according to an embodiment of the present invention is illustrated in FIG. 2A. According to the example in this figure, the pixel structure comprises an array of 5 by 5 sub-pixels but this number is not limiting. The pixel may, for example, comprise more or less rows and columns and may in general have n×m sub-pixels, wherein n and m are integers. However, the pixel may also have another shape, such as for example a triangular or circular shape, and may be organised in logical rows and columns. By this is meant that pixel elements are linked logically together in a topologically linear intersecting manner however, that the physical or topographical arrangement need not be so. For example, the rows may be circles and the columns radii of these circles and the circles and radii will, further in this invention, be described as "logically organised" rows and columns.

Figure 2B:
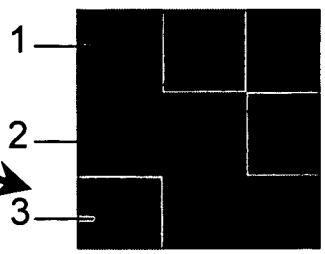
FIG. 2B is a magnified image of one sub-pixel of the pixel structure of FIG. 2A.

Each sub-pixel may comprise 3 sub-sub-pixels of a first colour (e.g. primary colour red (1)), 3 sub-sub-pixels of a second colour (e.g. primary colour green (2)) and 3 sub-sub-pixels of a third colour (e.g. primary colour blue (3)), as is illustrated in FIG. 2B, which shows a magnified image of one sub-pixel of the pixel structure of FIG. 2A. Again, a sub-pixel may comprise more or less than 3 sub-sub-pixels.

The capability to display intermediate levels between minimum and maximum luminance may be determined by the number of gray scales or by the number of bits. Most electro-optic materials allow intermediate levels by varying the driving voltage or the drive current. The driver circuits must be able to provide these intermediate levels, which makes them more complicated. Analogue drivers can provide a wide (infinite) range of gray scales. Digital drivers with N bits can provide $2^N$ gray scales. Some electro-optic materials do not allow drive voltage variation. In this case, gray scales can be produced by Pulse Width Modulation (PWM) or by sub-frames. In PWM, the width of the drive pulse is varied according to the desired gray scale. With sub-frames, each frame is divided in N sub-frames with different length (e.g. a binary ratio $1:2:4:\ldots:2^{N-1}$). The eye integrates over time the average luminance of a frame.

An advantage of the pixel structure as illustrated in FIG. 2A, compared to a conventional stripe type pixel structure as shown in FIG. 1, is that in the pixel structure of the present invention, area modulation can be used to realise several grayscales. Pulse width modulation (PWM) or one of the other methods described above may be used to create the additional desired grayscales.

In the pixel structure shown in FIGS. 2A and B, there are 5*5*3 squares of each primary colour within each pixel. This gives rise to about 6 bits/colour. Generally, when there are, for example, k areas of each primary colour within a sub-pixel and, for example, n×m sub-pixels within a pixel, the number of grayscales that can be created by area modulation equals:

$$\text{Number of Bits} = \log_2(k.n.m)$$

Another advantage of the pixel structure according to the present invention is that the primary colours are uniformly distributed within the proposed pixel structure. Therefore, a pixel will uniformly light up if one wants, for example, to display a full primary color image of one of the primary colours. This will lead to a higher quality image than if all the area of one particular colour would be grouped together in one pixel or sub-pixel. With the pixel structure according to the invention, the minimum viewing distance at which the individual pixels can not be distinguished anymore will be smaller compared to a display with the same resolution but using the standard pixel structure as shown in FIG. 1. So, the optimal viewing distance of a display using pixels with a structure according to this invention will be reduced, which is also an advantage. Furthermore, in order to avoid colour shifts of any kind, it is interesting to have a quite symmetric pixel structure. With symmetric pixel structure is meant that the pixel is built up by a number of 'basic' sub-pixels, which all comprise the same arrangement of sub-sub-pixels as can be clearly seen from FIG. 2.

The latter property leads to a further advantage of the pixel structure according to the invention with respect to the pixel structure as shown in FIG. 1, which is the ability to make a choice between a higher resolution and a smaller number of gray scales on one hand or a smaller resolution and a larger number of gray scales on the other hand. This allows using the same display hardware in order to realize different display resolutions.

Figure 3:
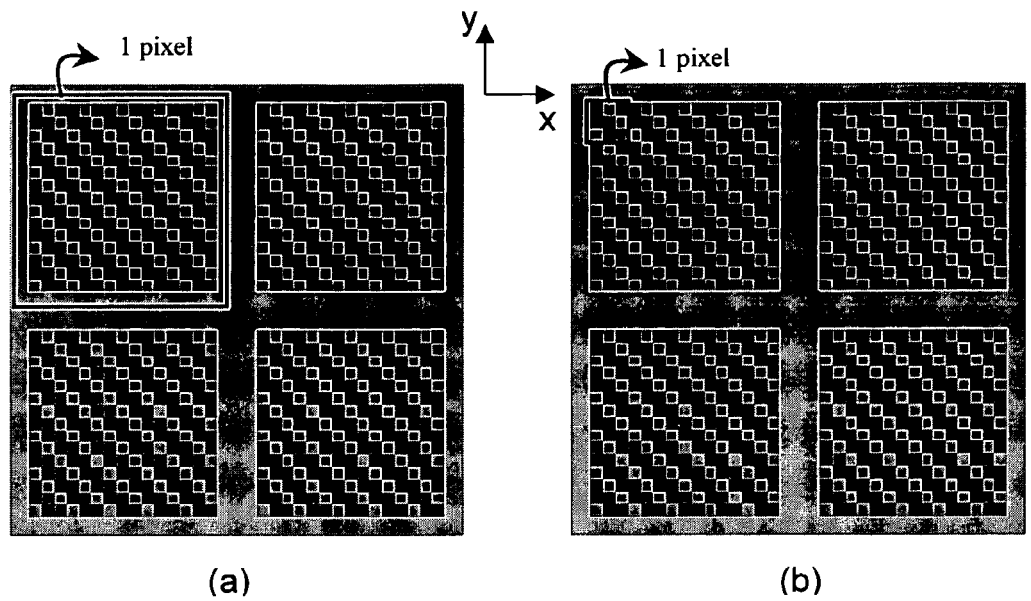
FIG. 3 illustrates the possibility to trade off between bit depth and display resolution: (a) bit depth=6 bits/color; (b) bit depth=1 bit/color. The resolution in (b) is 5 times higher than in (a).

In the pixel structure shown in FIG. 3(a) there are 5*5*3 squares of each primary colour within each pixel. This gives rise to a bit depth of 6 bits/colour. The other extreme would be, as shown in FIG. 3(b), to use the same pixel layout for a display with a resolution that is 5 times larger in the x direction and 5 times larger in the y direction. In that case, only 1 bit/colour is achieved.

Generally, there are for example k areas of each primary colour within a sub-pixel and n×m sub-pixels within a pixel. If it is assumed that the display resolution is (x)×(y) in case of maximum bit depth, the display resolution can be increased at the expense of the number of grayscales.

If, for example, the x resolution is increased by a factor U and the y resolution by a factor V, the number of bits per colour may be reduced from:

$$\text{Number of Bits} = \log_2(k \cdot n \cdot m)$$

to $$\begin{aligned}\text{Number of Bits} &= \log_2\left(\frac{k \cdot n \cdot m}{UV}\right)\\ &= \log_2(k \cdot n \cdot m) - \log_2(U) - \log_2(V)\end{aligned}$$

Therefore, with the pixel structure according to the invention, it is possible to make a trade-off between bit depth and display resolution by changing the size of a pixel, or by driving a pixel or a sub-pixel.

Figure 4:
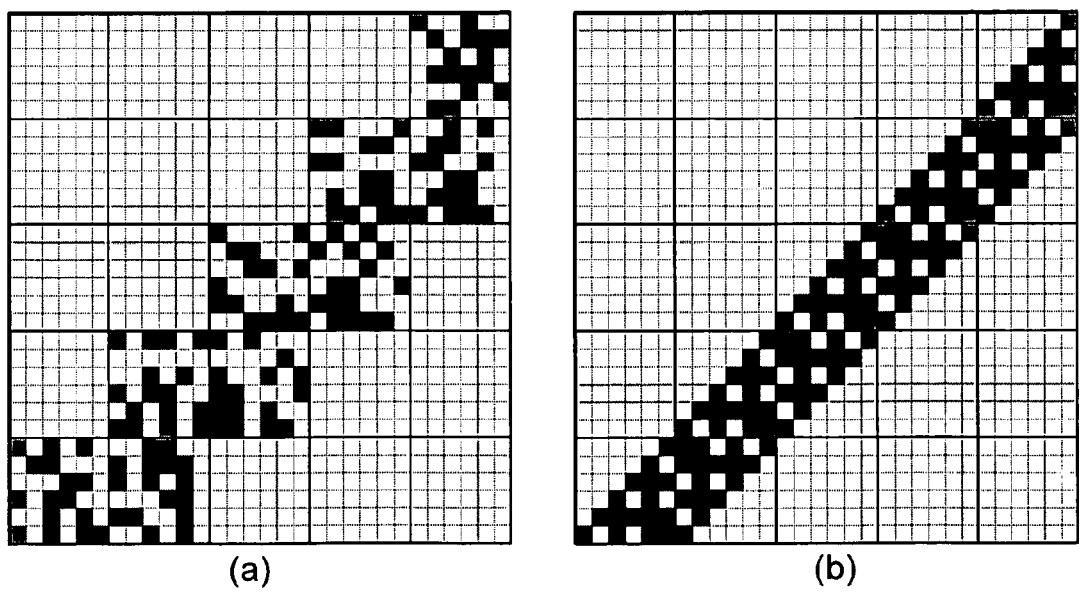
FIG. 4 illustrates an example of a reflective monochrome display with staggered pixel structure, displaying a stripe in case of (a) random internal bitmapping and (b) intelligent internal bitmapping in accordance with an embodiment of the present invention.

Mapping of the pixel bit depth to the pixel shades may be performed by means of random mapping. However, a more 'intelligent' choice of the internal mapping of the pixel bit depth to the pixel shades allows to use the maximum possible bit depth and still have an improved display resolution. For example, assume that, for example, a slanted line has to be displayed on the display which is, for example, a monochrome display consisting of an array 5 by 5 pixels, each pixel comprising 36 sub-sub-pixels (see FIG. 4 (sub-pixels are not explicitly shown)). Assume a luminance level corresponding to the lightening up of 16 sub-sub-pixels within each pixel is wanted. Representation of the stripe on the display is shown in FIG. 4, both in case of a random internal bitmapping (FIG. 4(a)) and in case of an intelligent internal bitmapping (FIG. 4(b)). Random lighting up of the 16 sub-sub-pixels thus gives the result as shown in FIG. 4(a). However, if the 16 sub-sub-pixels are lighted up more 'intelligent' a result as shown in FIG. 4(b) may be achieved. As can be seen from the figures, the effective resolution and thus image quality is much higher in case of an 'intelligent' internal bitmapping compared to a random internal bitmapping.

In a further embodiment of this invention, a reflective display is provided, comprising a plurality of pixels according to the present invention. If, for example, a tiled reflective display, i.e. one large display built up out of several smaller building blocks, is wanted, it is desirable that the entire tiled display entity looks monolithic. This requires that the distance between two pixels of the same display element, two neighboring display elements or neighboring tiles must be the same. Between two tiles in a tiled display there will be a line, which is mechanically different but must look the same as the lines between individual pixels. It would be a straightforward solution to make the area between the pixels black, since this will increase the contrast ratio of the reflective display. However, due to the black separation between the pixels, the individual pixels will be better distinguishable if one looks at the display from a certain viewing distance.

Therefore, it is an object of the present invention to improve the image quality of a reflective display, by increasing the reflectivity of the area between the pixels. The principle explained below is valid for any type of pixel structure, i.e. it has not necessarily to be used in combination with the staggered pixel structure described above.

Figure 5:
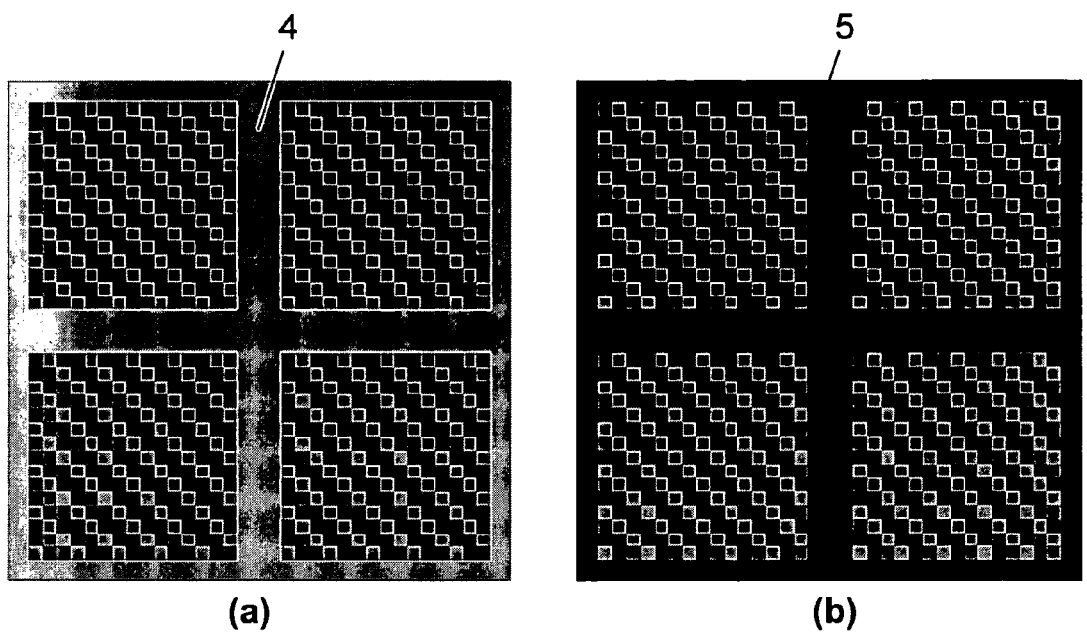
FIG. 5 illustrates an example of a gray area between the pixels and a black area between the pixels in accordance with an embodiment of the present invention.

FIG. 5 shows an example of a pixel design with a gray area 4 between the pixels (FIG. 5a) and a pixel design with a black area 5 between the pixels (FIG. 5b). Making the area 4 between the pixels gray, will significantly improve some aspects of the image quality, since the image on the display with a gray area 4 between the pixels will give a much less pixellated impression compared to the image on a display with a black area 5 between the individual pixels, when viewed form the same distance. The overall display brightness will also increase since the reflectivity of the gray area 4 is per definition larger than the reflectivity of the black area 5 (the black area has ideally a reflectivity of 0%).

A gray area 4 between the pixels (FIG. 5a) instead of a black area 5 (FIG. 5b) has however also some disadvantages. A first disadvantage is that the contrast ratio of the display will decrease since the amount of reflected light in the off state will increase due to the increased reflectivity on the gray area 4 between the pixels. A second disadvantage is that the colour gamut that can be realised with the reflective display will become slightly smaller when a gray area 4 is used in between the pixels instead of a black area 5. This is a consequence of the fact that our eye will integrate the total amount of reflected light.

These disadvantages can be overcome, by making the gray area 4 between the pixels variable. This can be realised e.g. dividing the area between the pixels into pixels of which the colour/grayscale can be controlled by e.g. controlling the driving voltage. This allows, e.g. to make the area between the pixels very dark, when for example a very dark image needs to be shown on the display. This also allows modifying the gray level between the pixels based on the environmental conditions. Furthermore, making the gray area 4 between the pixels variable allows to make the area between the pixels black when the color properties of the displayed images are very important.

The above described method thus allows to vary the luminance of the area between the pixels between black, different gray levels and white. This method can of course only be applied for the area between the pixels and not for the area between the tiles. Therefore, the brightness level of the area 4, 5 between the pixels should be carefully controlled in order to eliminate or minimise the visibility of the seams between the tiles.

Based on the advantages and disadvantages of the gray area 4 between the pixels, it will be possible to determine an optimal 'gray level' for the area 4, 5 between the pixels that gives the best image quality. This optimal 'gray level' may be different depending on the display content or the environmental conditions.

The above described method, i.e. tuning of the interpixel area 4, 5, is not limited to displays comprising a pixel structure according to the invention, but may be applied to displays comprising pixels with whatever pixel structure such as e.g. square, triangular, rectangular, triangular, . . . pixels and does not change the shape of the pixel structure. It only influences the image quality.

An advantage of the pixel structure according to the invention is that area modulation can be used to create a certain amount of grayscales. Furthermore, using the pixel structure of the invention, a better image quality may be achieved due to uniform spreading of sub-sub-pixels of a certain primary colour within a pixel.

Another important advantage of the invention is that the pixel structure allows to make a trade-off between bit depth and resolution.

Moreover, a higher effective resolution may be achieved in case of intelligent internal bitmapping to pixel shades, without loosing bit depth.

The present invention also includes software for driving pixel arrays as described with respect to the embodiments of the present invention. The software is executable on a suitable processing engine such as a microprocessor or microcontroller, e.g. also on an embedded microprocessor. The software includes computer a program or computer programs, e.g.

stored on a personal computer, a laptop, a PDA, a smartphone, a workstation or similar. The software may be stored on a suitable data carrier, e.g. a CD-ROM, magnetic tape, diskette, memory cared or key, etc.

While a particular form of the invention has been illustrated and described, it will be apparent that various modifications can be made without departing from the spirit and scope of the invention.

It is to be understood that although specific constructions and configurations, as well as materials, have been discussed herein for devices according to the present invention, deviations can be made therein without departing from the spirit and scope of the present invention.

While the invention has been shown and described with reference to preferred embodiments, it will be understood by those skilled in the art that various changes or modifications in form and detail may be made without departing from the scope and spirit of this invention.

The invention claimed is:

1. A reflective display comprising:
   a plurality of picture elements;
   an addressing arrangement for addressing each picture element selectively and independently with one image datum; and
   each picture element comprising a plurality of sub-pixels, each sub-pixel comprising at least two sub-sub-pixels, each sub-sub pixel being for the emission of light of one of at least two colours, the sub-sub pixels being uniformly arranged within said sub-pixel, each sub-pixel comprising the same arrangement of sub-sub-pixels.

2. A reflective display according to claim 1, further comprising means for driving said plurality of picture elements.

3. A reflective display according to claim 1, wherein the addressing arrangement is arranged such as to select different pixels, sub-pixels and/or sub-sub-pixels separately or at the same time.

4. A reflective display according to claim 2, wherein the means for driving said plurality of picture elements is arranged such as to select different picture elements, sub-pixels and/or sub-sub-pixels separately or at the same time.

5. A reflective display according to claim 2, wherein the means for driving said plurality of picture elements is arranged such as to selectively apply a particular resolution and/or bit depth.

6. A reflective display according to claim 5, wherein said particular resolution and/or bit depth is selectively applied within an area of the display.

7. A reflective display according to claim 5, wherein said particular resolution and/or bit depth is selectively applied within an area of a pixel.

8. A reflective display according to claim 5, wherein said particular resolution and/or bit depth is selectively applied within an area of a sub-pixel.

9. A reflective display according to claim 5, wherein said particular resolution and/or bit depth is selectively applied to an object within an image and displayed on the display.

10. A reflective display according to claim 2, wherein the means for driving said plurality of picture elements is arranged such as to perform intelligent internal bitmapping.

11. A reflective display according to claim 10, wherein said intelligent bitmapping allows increasing the effective display resolution without loosing bit depth.

12. A reflective display according to claim 1, the addressing arrangement and the picture elements being arranged for display of an arbitrary image, furthermore comprising an area between said plurality of picture elements, further comprising means for varying the luminance of said area.

13. A reflective display according to claim 12, wherein the luminance of the area between the picture elements is varied in order to optimise the image quality of the display.

14. A reflective display according to claim 1, wherein the reflective display is a tiled display.

* * * * *